United States Patent
Kadowaki (10) Patent No.: US 10,040,342 B2
(45) Date of Patent: Aug. 7, 2018

(54) VIBRATION ISOLATING DEVICE

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 15/515,789

(22) PCT Filed: Aug. 31, 2015

(86) PCT No.: PCT/JP2015/074785
§ 371 (c)(1),
(2) Date: Mar. 30, 2017

(87) PCT Pub. No.: WO2016/056329
PCT Pub. Date: Apr. 14, 2016

(65) Prior Publication Data
US 2017/0305254 A1     Oct. 26, 2017

(30) Foreign Application Priority Data
Oct. 6, 2014   (JP) .................................. 2014-205909

(51) Int. Cl.
*F16F 5/00* (2006.01)
*B60K 5/12* (2006.01)
*F16F 15/08* (2006.01)

(52) U.S. Cl.
CPC .......... *B60K 5/1266* (2013.01); *B60K 5/1216* (2013.01); *F16F 15/08* (2013.01)

(58) Field of Classification Search
CPC .. B60K 5/1266; B60K 5/1216; B60K 5/1208; F16F 15/08; F16F 13/106
(Continued)

(56) References Cited

U.S. PATENT DOCUMENTS 5,386,973 A * 2/1995 Brenner ................ F16F 13/108
267/140.13
8,814,151 B2 * 8/2014 Matsuda ............... F16F 13/102
267/140.13
(Continued)

FOREIGN PATENT DOCUMENTS

| JP | H06-109061 | 4/1994 |
| JP | 2013-036508 | 2/2013 |
| JP | 2013-181639 | 9/2013 |

OTHER PUBLICATIONS

International Search Report, dated Oct. 6, 2015 (dated Oct. 6, 2015).

*Primary Examiner* — Pamela Rodriguez
(74) *Attorney, Agent, or Firm* — Hankin, Hill & Clark LLP (57) ABSTRACT

When an insulator is of non-circular shape, a spring ratio of an X direction to a Y direction is increased by utilizing this non-circular shape. A pair of direction elastic walls opposed to each other in the X direction is formed short and thin in the Y direction and has a small X direction projected area. Similarly, a second mounting metal fitting is formed in a rectangular shape extending long in the X direction and includes a pair of X direction restraint walls opposed to each other in the X direction and a pair of Y direction restraint walls opposed to each other in the Y direction. A first mounting metal fitting includes a pair of X direction restraint projecting parts opposed to each other in the X direction and a pair of Y direction restraint walls opposed to each other in the Y direction.

10 Claims, 9 Drawing Sheets

(58) Field of Classification Search
USPC .......... 267/140.11, 141, 141.2; 248/636–638
See application file for complete search history.

(56) References Cited

U.S. PATENT DOCUMENTS

| | | | | |
|---|---|---|---|---|
| 2011/0101581 A1* | 5/2011 | Kubo | ................... | F16F 13/106 |
| | | | | 267/140.13 |
| 2012/0299229 A1* | 11/2012 | Kubo | ................... | F16F 13/106 |
| | | | | 267/140.13 |
| 2015/0316121 A1* | 11/2015 | Kadowaki | ............. | F16F 13/106 |
| | | | | 267/140.13 |

* cited by examiner

VIBRATION ISOLATING DEVICE

TECHNICAL FIELD

The present invention relates to a vibration isolating device for use in an engine mount for a motor vehicle or the like.

BACKGROUND ART

A liquid sealed engine mount is publicly known and generally, comprises a first mounting metal fitting to be mounted on an engine, a second mounting metal fitting to be mounted on a vehicle body, and an insulator which provides a connection between these metal fittings.

This type of engine mount has the insulator and the second mounting metal fitting which are formed in a circular shape in a plan view as seen from the direction of a mount center axis. However, since their installation spaces become relatively large when the insulator and the second mounting metal fitting are formed in a circular shape, there may be cases where the arrangement becomes difficult depending on a layout within an engine room.

Therefore, there is another engine mount in which the insulator and the second mounting metal fitting are formed in a non-circular shape such as a rectangle or the like (see a patent reference 1). With this construction, the arrangement can be made efficiently in a narrow space.

PRIOR ART REFERENCE

Patent reference 1: Japanese Patent Application Laid-Open Publication No. 2013-181639.

DISCLOSURE OF THE INVENTION

Problem to be Solved by the Invention

By the way, in the engine mount provided with these insulator and second mounting metal fitting of non-circular shape set forth above, it may be required to differentiate a spring ratio with respect to two directions orthogonal to the vehicle body, for example, a forward and rearward direction (hereinafter, referred to as an X direction) and a left and right direction (hereinafter, referred to as a Y direction) on a large scale and to make the spring ratio of the X direction to the Y direction larger. The adjustment of such spring ratio is generally performed by changing a thickness of the insulator or a restraint area thereof.

However, in the conventional engine mount having the insulator and the second mounting metal fitting each of which is of non-circular shape, the spring ratio is not adjusted by utilizing their shapes, and the durability with respect to a part of the insulator is not improved with adjustment of the spring ratio.

Therefore, it is desired to create the large spring ratio by utilizing the specific shapes of the insulator and the second mounting metal fitting and to improve the durability with respect to a part of the insulator.

Means for Solving the Problem

In order to achieve the above object, a vibration isolating device according to a first feature of the present invention comprises a first mounting metal fitting (12) to be mounted on a vibration generating source side, a second mounting metal fitting (14) to be mounted on a vibration receiving side, and an insulator (16) providing a connection between the first and second mounting metal fittings and having an elastic wall part of non-circular shape in a plan view which surrounds a recessed space provided on an inner side, wherein letting X and Y be two directions intersecting at right angles to each other within a plane orthogonal to an inputting direction of a main vibration, the elastic wall part of the insulator (16) includes a pair of X direction elastic walls (40) which are opposed to each other in the X direction and a pair of Y direction elastic walls (42) which are opposed to each other in the Y direction, wherein a length in the X direction of each of the Y direction elastic walls (42) is greater than a length in the Y direction of each of the X direction elastic walls (40), and a projected area (S2) in the Y direction of each of the Y direction elastic walls (42) is larger than a projected area (S1) in the X direction of each of the X direction elastic walls (40), wherein the second mounting metal fitting (14) has a length in the X direction different from that in the Y direction in such a manner as to be long in the X direction and short in the Y direction, wherein the second mounting metal fitting (14) is formed at its periphery with a standing wall part which projects in the Z direction so as to restrain the insulator (16), and the standing wall part includes a pair of X direction restraint walls (60) which are opposed to each other in the X direction and a pair of Y direction restraint walls (62) which are opposed to each other in the Y direction, and wherein a length (L2) in the X direction of a base part of each of the Y direction restraint walls (62) is greater than a length (L1) in the Y direction of a base part of each of the X direction restraint walls (60), and a projecting height of each of the Y direction restraint walls (62) is larger than that of each of the X direction restraint walls (60).

According to a second feature of the present invention, in addition to the first feature, a thickness of the X direction elastic wall (40) of the insulator (16) is relatively thinner than a thickness of the Y direction elastic wall (42).

According to a third feature of the present invention, in addition to the first or second feature, the first mounting metal fitting (12) is provided with a restraint projecting part which projects toward the second mounting metal fitting (14) side so as to restrain the insulator (16), wherein the restraint projecting part includes a pair of X direction restraint projecting parts (50) which are opposed to each other in the X direction and a pair of Y direction restraint projecting parts (52) which are opposed to each other in the Y direction, each of the X direction restraint projecting parts (50) is arranged spaced apart so as not to overlap with the X direction restraint wall (60) of the second mounting metal fitting (14) in the X direction, and the X direction elastic wall (40) is elastically deformed mainly due to shear deformation.

According to a fourth feature of the present invention, in addition to the third feature, each of the Y direction restraint projecting parts (52) projects long so as to overlap with the Y direction restraint wall (62) in the Y direction, and the Y direction elastic wall (42) is elastically deformed mainly due to compressive deformation between the Y direction restraint projecting part (52) and the Y direction restraint wall (62) in the Y direction.

According to a fifth feature of the present invention, in addition to any one of the first to fourth features, the non-circular shape is substantially a rectangle.

Effects of the Invention

According to the first feature of the present invention, the insulator (16) and the second mounting metal fitting (14) are formed in a non-circular shape, and the length in the X direction is different from that of the Y direction (X>Y). In addition, the X direction restraint wall (60) of the restraint wall which is provided in the second mounting metal fitting (14) and projects in the Z direction is lowered and the Y direction restraint (60) thereof is made higher. With this configuration, the restraint area of the X direction elastic wall (40) of the insulator (16) is made small and the free length thereof is made large, whereby it is possible to make the spring value relatively smaller. Moreover, the restraint area of the Y direction elastic wall (42) is made larger and the free length thereof is made smaller whereby it is possible to make the spring value relatively larger. Therefore, the spring value in the X direction can be made different from that in the Y direction, so that the spring ratio of the X direction to the Y direction can be varied large.

Further, the projecting heights of the X direction restraint wall (60) and the Y direction restraint wall (62) are varied, so that the spring values can be easily adjusted.

In addition, since the insulator (16) is of non-circular shape, the Y direction elastic wall (42) which is long in the X direction and has a large projected area can be supported by the Y direction restraint wall (62) having a large area.

Moreover, since the Y direction elastic wall (42) is formed long in the X direction and has the large projected area (S2), so as to make it possible to increase the volume of an elastic body with respect to an input in the Y direction, the stress can be distributed widely and the adjustment of the spring value in the Y direction for increasing the restraint area and shortening the free length as referred to above becomes easy.

Further, since the Y direction restraint wall (62) on the longitudinal side is increase in area so that the Y direction elastic wall (42) having the large projected area (S2) can be supported long and widely in the X direction, the stress concentration relative to the restraint part can be alleviated. As a result, the spring value in the Y direction can be increased and the durability can be improved. Therefore, the increase in spring ratio and the improvement in durability can be achieved by utilizing the non-circular shape of the insulator (16).

According to the second feature of the present invention, since the thickness of the X direction elastic wall (40) of the insulator (16) is relatively thinner than the thickness of the Y direction elastic wall (42), the spring ratio of the X direction to the Y direction can be varied larger. Therefore, the spring value of the Y direction elastic wall (42) can be increased, and the Y direction elastic wall (42) having the large area can be effectively supported by the Y direction restraint wall (62), whereby it is possible to improve the durability of the insulator (16).

According to the third feature of the present invention, since the X direction restraint projecting part (50) and the X direction restraint wall (60) are spaced apart so as not to overlap with each other in the X direction, the X direction elastic wall (40) is deformed mainly due to the shear deformation with respect to the input in the X direction, whereby the spring value in the X direction can be reduced.

According to the fourth feature of the present invention, since the Y direction restraint projecting part (52) and the Y direction restraint wall (62) overlap with each other in the Y direction, the Y direction elastic wall (42) is deformed mainly due to the compressive deformation between the Y direction restraint projecting part (52) and the Y direction restraint wall (62) with respect to the input in the Y direction, whereby the spring ratio in the Y direction can be increased.

According to the fifth feature of the present invention, since the insulator (16) and the second mounting metal fitting (14) are formed in a rectangular shape respectively, the spring ratio of the X direction to the Y direction can be made larger.

BRIEF DESCRIPTION OF THE DRAWINGS

FIG. 8-A is a projection chart of each of an X direction elastic wall;

FIG. 8-B is a Y direction elastic wall; and

BEST MODE FOR CARRYING OUT THE INVENTION

Hereinafter, an embodiment of a vibration isolating device formed as an engine mount for a vehicle will be described with reference to the accompanying drawings.

This engine mount 10 is a liquid sealed type in which a first mounting metal fitting 12 and a second mounting metal fitting 14 are integrally connected by an insulator 16 made of a proper elastic body such as rubber or the like, and liquid is sealed in an interior of the engine mount 10. The insulator 16 is an elastic body functioning as a vibration isolating main body.

The first mounting metal fitting 12 is mounted through a first bracket 18 on an engine (not shown) which is a vibration generating source. The second mounting metal fitting 14 is mounted through a second bracket 20 on a vehicle body (not shown). By the way, a forward and rearward direction of the vehicle body is designated as X, a left and right direction thereof is designated as Y, and an upward and downward direction is designated as Z. X and Y intersect at right angles to each other within the same plane. Z is orthogonal to these X and Y. In addition, the X direction is the left and right direction of FIG. 2, the Y direction is the left and right direction of FIG. 3, and the Z direction is the upward and downward direction of FIG. 2 and also an inputting direction of main vibration. The Z direction overlaps with a mount center axis CL (FIGS. 2 and 3) and extends in parallel therewith. In addition, a plan view is a view in the Z direction as seen from the upper side of FIG. 2.

Figure 1:
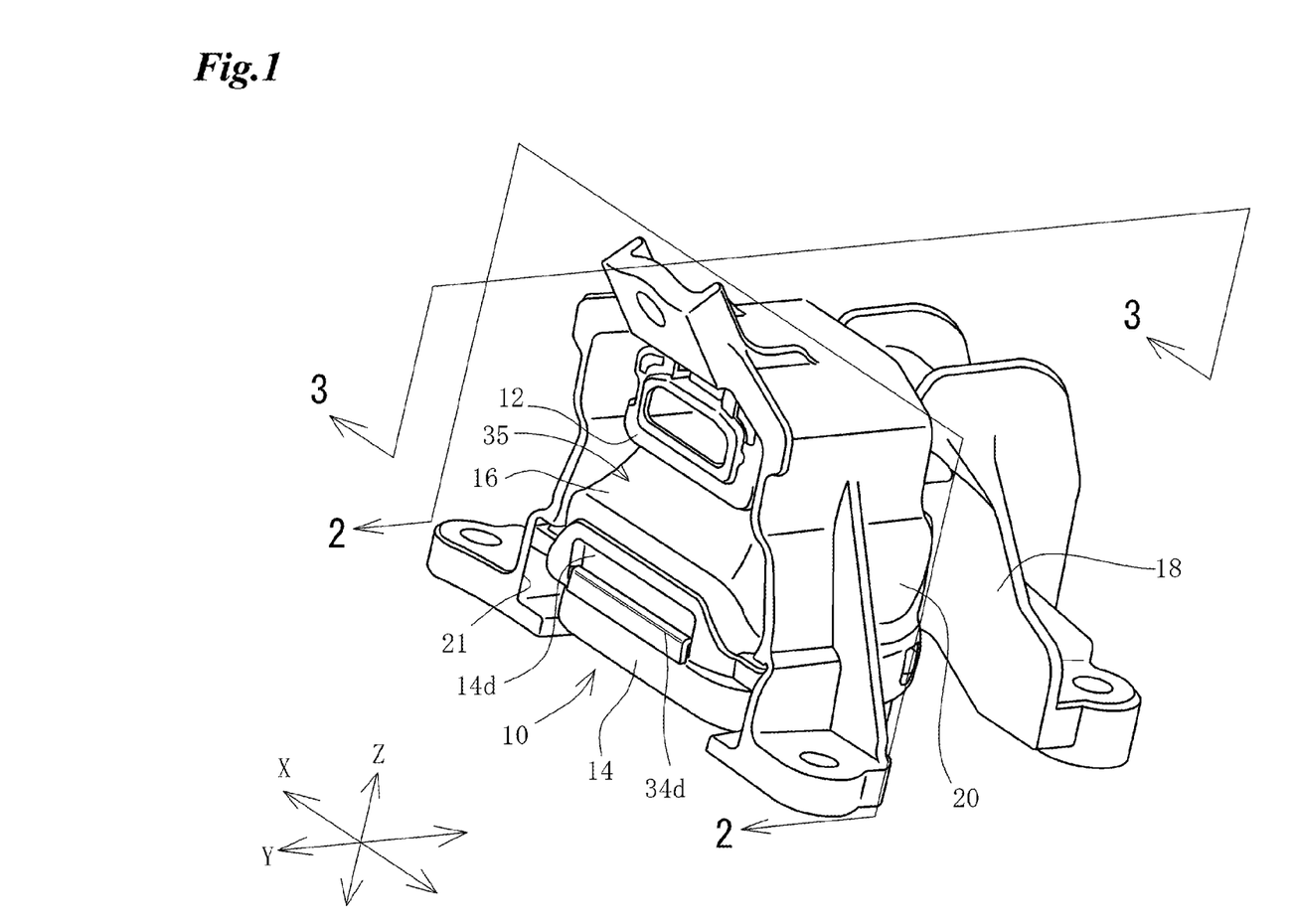
FIG. 1 is a perspective view of an engine mount in accordance with an embodiment.
Figure 2:
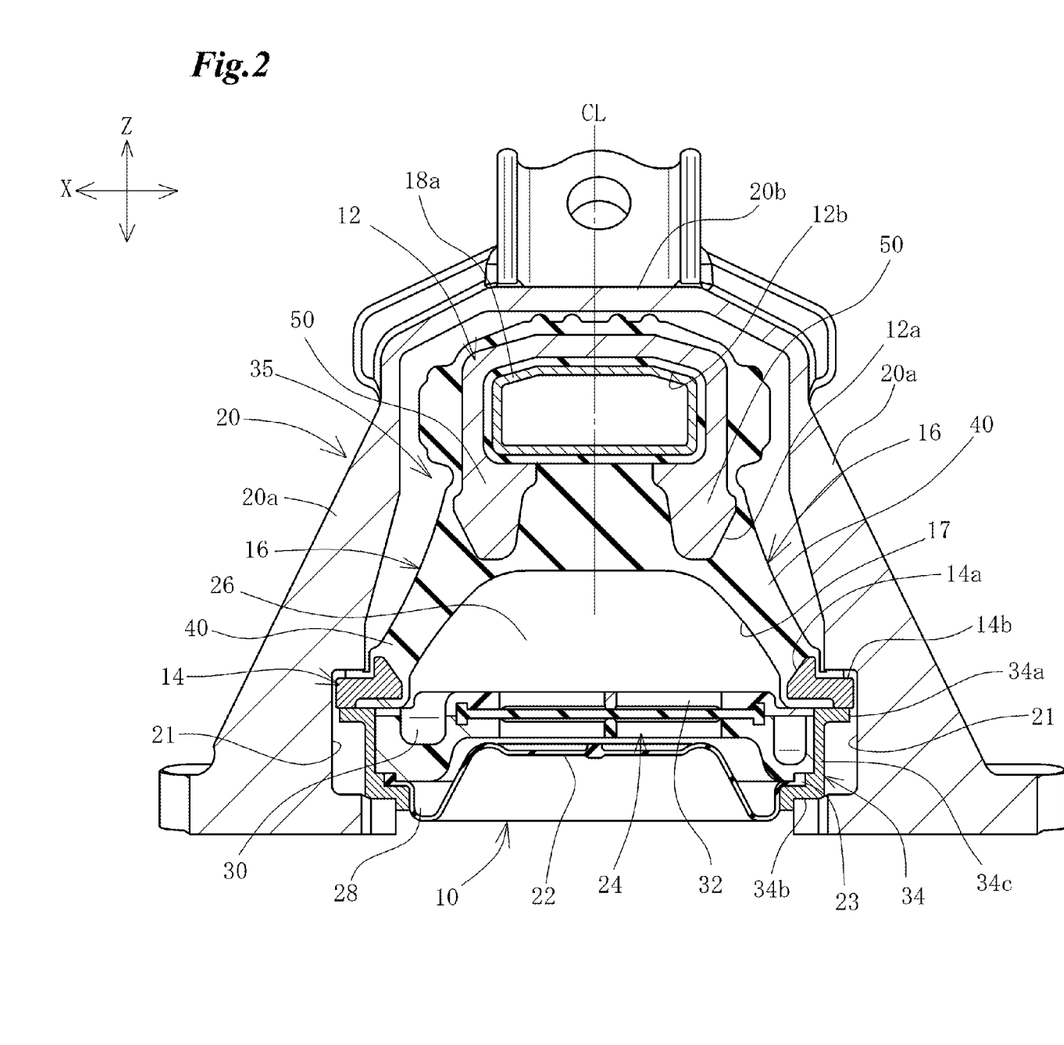
FIG. 2 is a cross sectional view taken on line 2-2 of FIG. 1.
Figure 3:
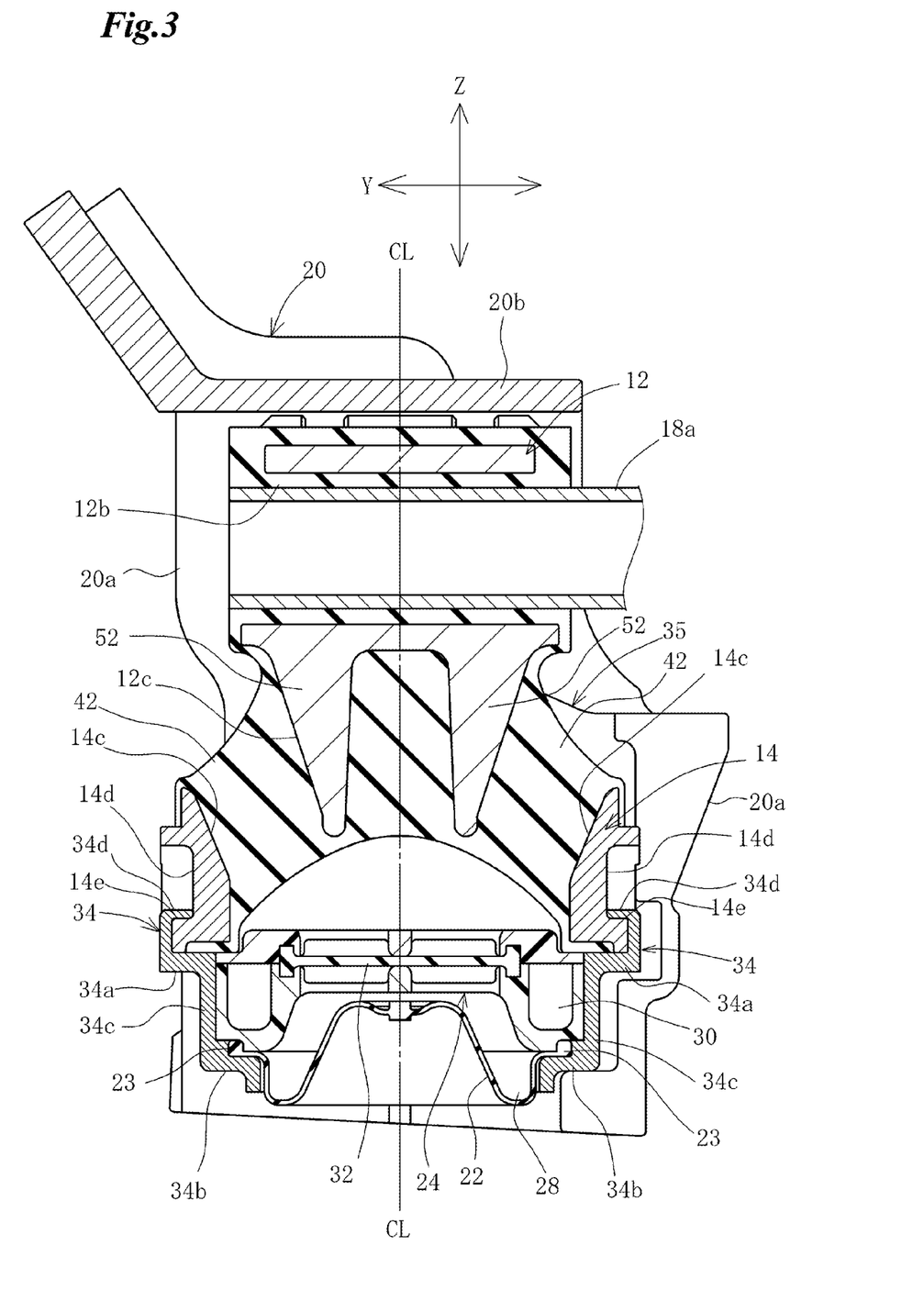
FIG. 3 is a cross sectional view taken on line 3-3 of FIG. 1.

FIG. 2 is a cross sectional view taken on line 2-2 of FIG. 1, that is, a cross sectional view in the X direction of the engine mount 10. FIG. 3 is a cross sectional view taken on line 3-3 of FIG. 1, that is, a cross sectional view in the Y direction of the engine mount 10.

In these drawings, the insulator 16 is inclined toward the first mounting metal fitting 12 so as to be tapered upwardly and provided in the interior thereof with a recessed space 17. The recessed space 17 opens downward, and this downward opening is covered with a diaphragm 22, so that a hermetically sealed space is formed between the insulator 16 and the diaphragm 22.

The liquid is filled and sealed into the hermetically sealed space so as to form a liquid chamber. This liquid chamber is partitioned up and down by a partition member 24. An interior of the recessed apace 17 on the upper side is formed as a primary liquid chamber 26, and a part on the lower side surrounded with the diaphragm 22 is formed as a secondary liquid chamber 28. An orifice passage 30 is formed in an outer peripheral part of the partition member 24 so as to provide communication between the primary liquid chamber 26 and the secondary liquid chamber 28.

The orifice passage 30 is configured to generate fluid resonance to thereby obtain high damping at the time of an input vibration of a predetermined frequency.

In the middle part of the partition member 24 there is provided an elastic movable diaphragm 32 which is configured to be elastically deformed in accordance with changes of an internal pressure of the primary liquid chamber 26 whereby to absorb internal pressure fluctuation of the primary liquid chamber 26.

A lower end portion of the insulator 16 is placed on the outer peripheral part of the partition member 24, and a lower surface of the outer peripheral part of the partition member 24 is placed on a thick outer peripheral part of the diaphragm 22. Then, the thick outer peripheral part of the diaphragm 22 is fixedly secured by a diaphragm presser foot 34.

The diaphragm presser foot 34 has substantially a crank-shaped cross section in the cross sectional view of FIG. 2 and is a member made of metal or resin. A lower part of the diaphragm presser foot 34 is formed as an inwardly projecting lower flange 34*b*, an upper part thereof is formed as an outwardly projecting upper flange 34*a*, and an intermediate part thereof is formed as a standing wall part 34*c* which extends along a lateral surface of the outer periphery of the partition member 24.

The upper flange 34*a* abuts on a lower surface of an outward projecting part 14*b* formed by letting a part of the second mounting metal fitting 16 project longer than the insulator 16 outwardly in the X direction. The lower flange 34*b* presses the thick outer peripheral part 23 against the lower surface of the outer peripheral part of the partition member 24.

As shown in FIG. 3, in a cross sectional view in the Y direction, a part of the diaphragm presser foot 34 has an upwardly extending part 34*d* which projects further upwardly from the upper flange 34*a*. An upper end portion of the outwardly extending part 34*d* is bent inwardly and fixedly caulked to a step portion 14*e* which is provided in a lower part of an outwardly opening engagement recess 14*d* formed in an outer peripheral part of the second mounting metal fitting 14.

Accordingly, when the insulator 16, the partition member 24 and the thick outer peripheral part of the diaphragm 22 are superimposed and covered with the diaphragm presser foot 34 from below and the upper end portion of the upwardly extending part 34*d* is caulked and fixed to the step portion 14*e* provided in an lower part of the second mounting metal fitting 14, the insulator 16, the partition member 24 and the diaphragm 22 are integrally combined so that the engine mount 10 is assembled.

This assembled engine mount 10, as shown in FIG. 2, is united with the second bracket 20 by press fitting the outward projecting part 14*b*, the upper flange 34*a*, the standing wall part 34*c* and the lower flange 34*b* into a substantially U-shaped press fitting concave part 21 formed in a leg part 20*a* of the second bracket 20.

The second bracket 20 is formed in a substantially portal shape when viewed in the Y direction and comprises a pair of leg parts 20*a* opposed to each other in the X direction and a top portion 20 which connects upper portions of the leg parts 20*a*. The engine mount 10 is accommodated in a portal space.

By the way, the first mounting metal fitting 12 is provided at the upper part thereof with a through hole 12*b* which extends in the Y direction. When a connecting arm 18*a* of the first bracket 18 is fitted into and engaged with the through hole 12*b*, the first mounting metal fitting 12 is united with the first bracket 18.

In addition, as shown in FIG. 3, an interior portion and an outer peripheral portion of the through hole 12*b* are continuous with the insulator 16 and covered with a part of the insulator 16.

Figure 4:
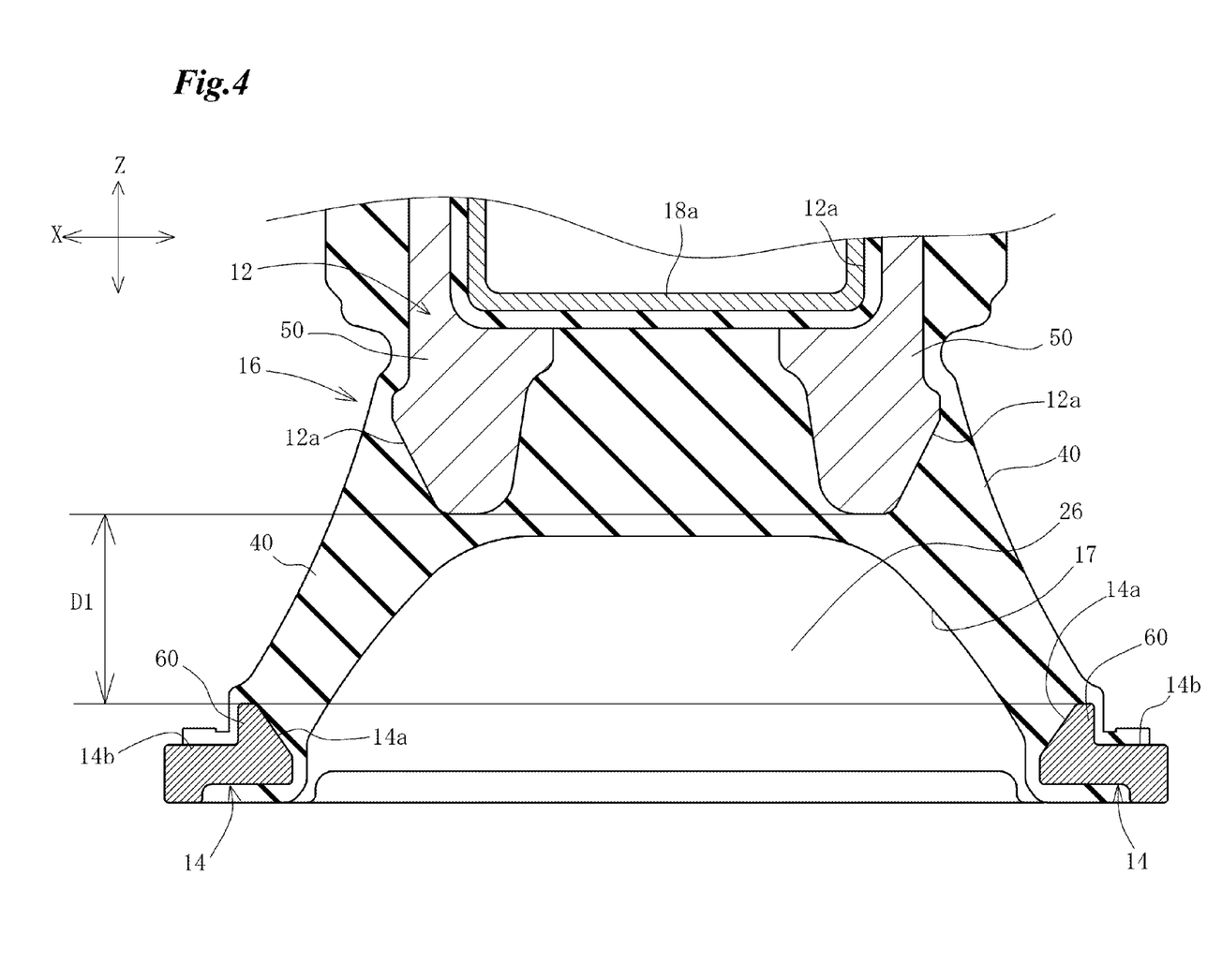
FIG. 4 is an enlarged view showing a part of FIG. 2.
Figure 5:
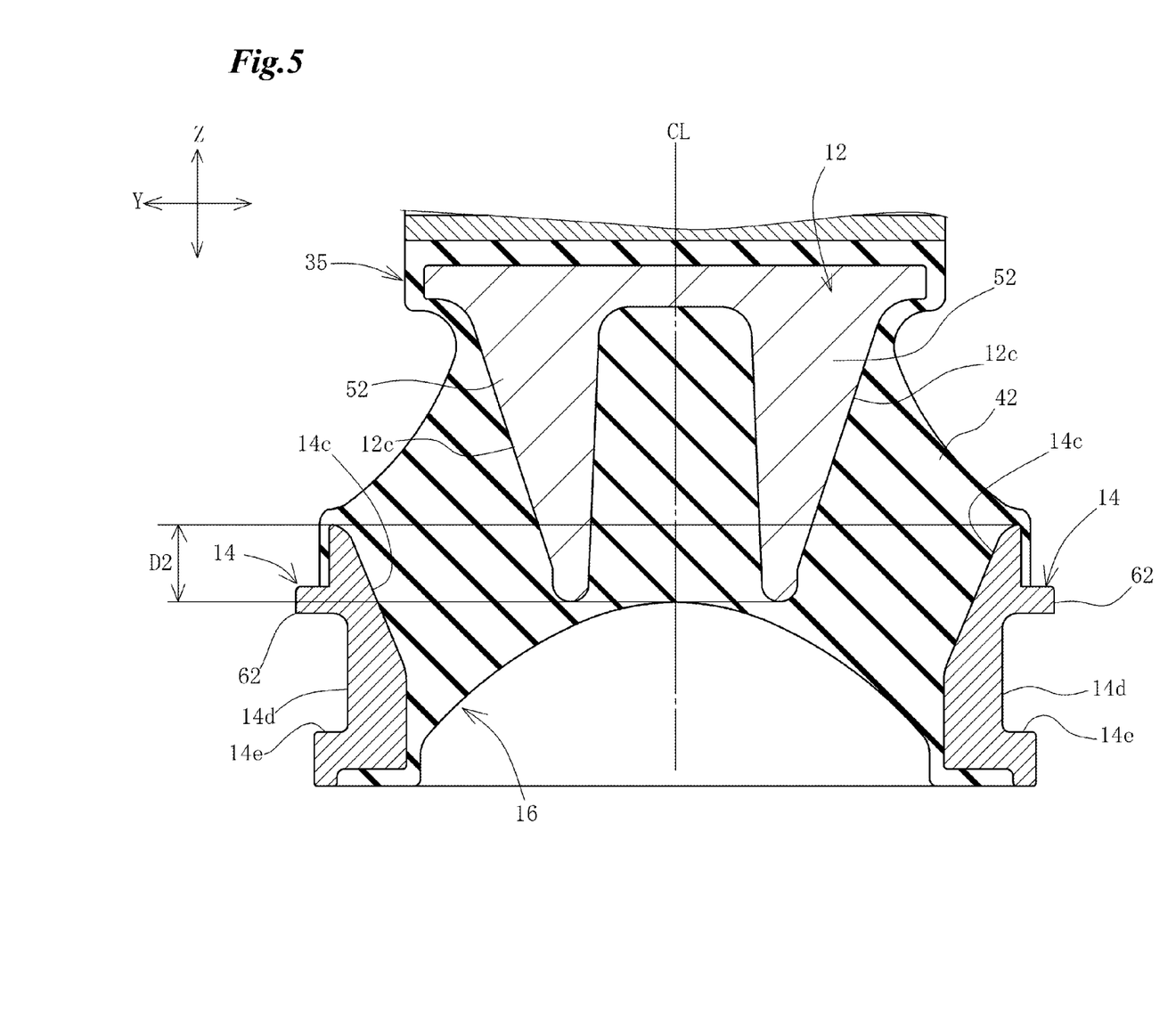
FIG. 5 is an enlarged view showing a part of FIG. 3.
Figure 6:
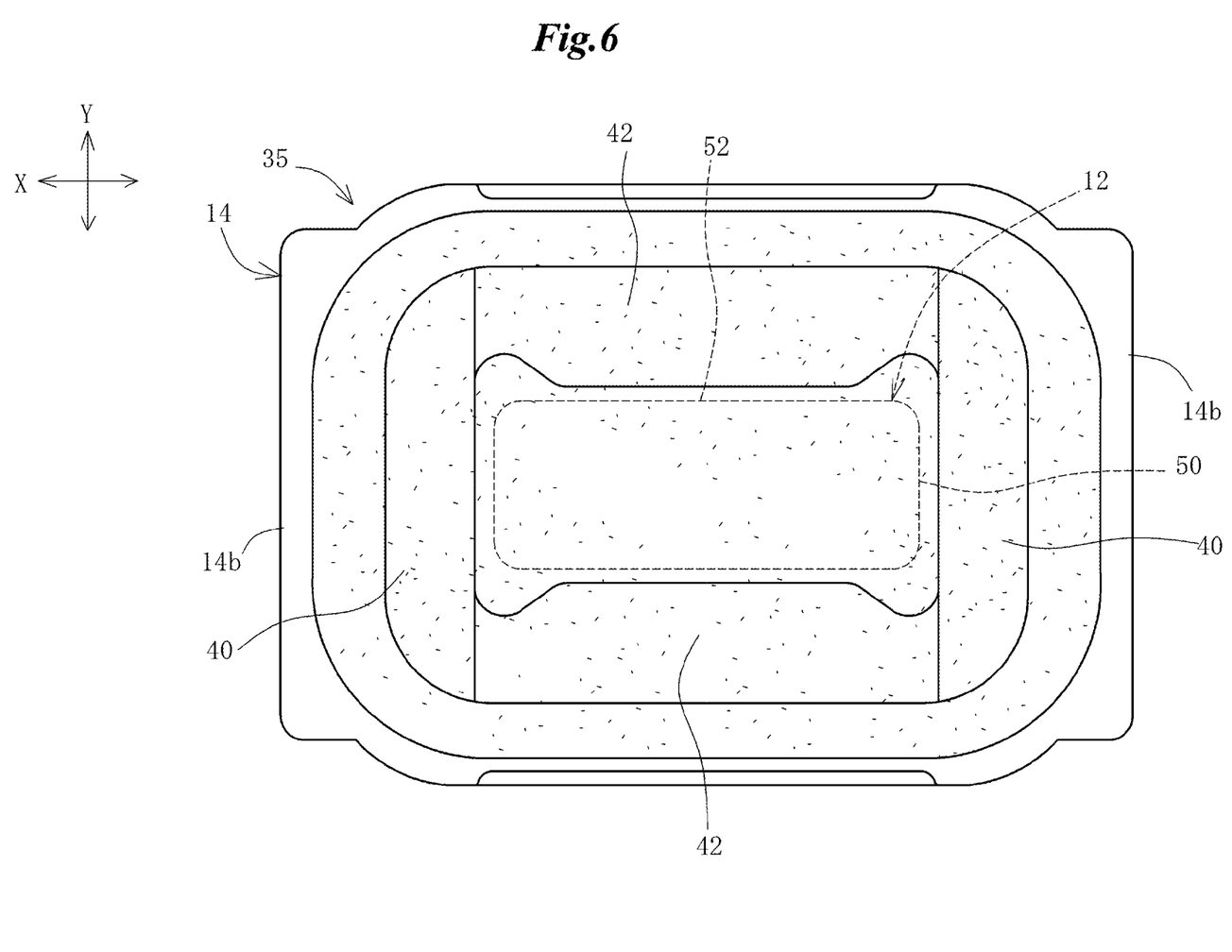
FIG. 6 is a view of a vibration main body part as seen from a lower side of FIG. 4.
Figure 7:
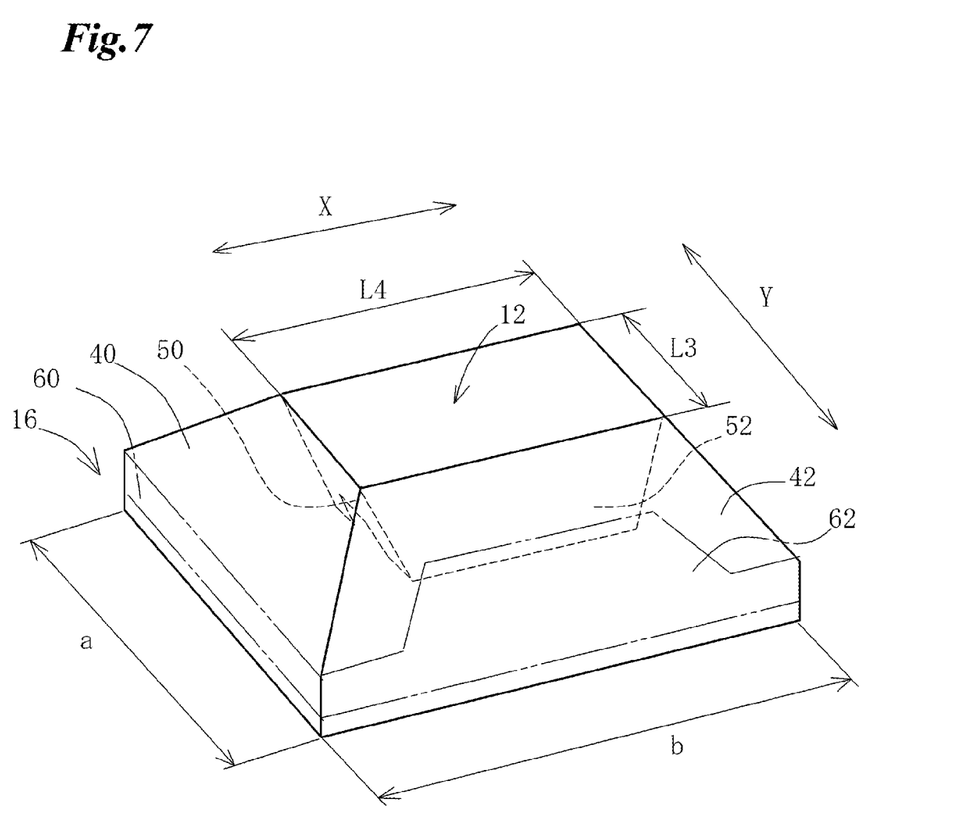
FIG. 7 is a schematic perspective view of an insulator.
Figure 8:
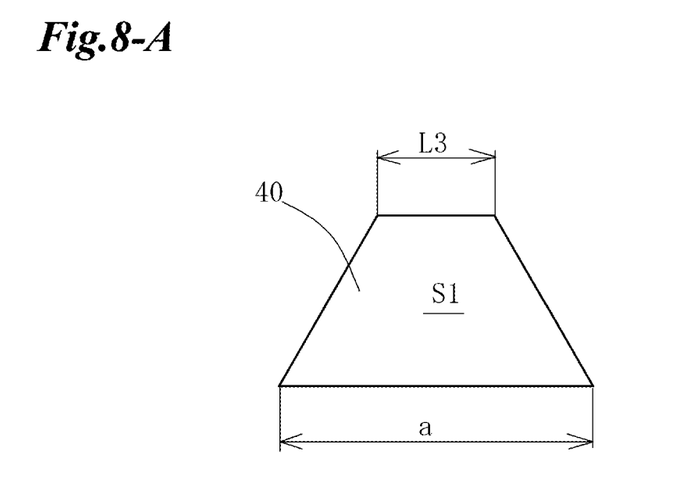

FIG. 4 is an enlarged view of the insulator 16 and a vibration isolating main body part 35 into which the first mounting metal fitting 12 and the second mounting metal fitting 14 are integrated. FIG. 5 is an enlarged view of the vibration isolating main body part 35 of FIG. 3. FIG. 6 is a view of the vibration isolating main body part 35 as seen from the lower side of FIG. 4, in which an interior of the insulator 16 is shown. FIG. 7 is a schematic perspective view of the insulator 16. FIG. 8 is a projection chart of each of elastic walls of the insulator 16, in which FIG. 8-A is a projection chart in the Y direction of an X direction elastic wall and FIG. 8-B is a projection chart in the X direction of a Y direction elastic wall.

As shown in FIG. 6, a lower end opening part of the insulator 16 is of substantially a rectangular shape which extends long in the X direction, and as a result, the primary liquid chamber 26 is also of a rectangular shape in a plan view (when viewed in the Z direction).

In addition, the first mounting metal fitting 12, the second mounting metal fitting 14, the diaphragm 22 and the partition member 24 also are of a rectangular shape in a plan view respectively, and similarly the secondary liquid chamber 28 is of a rectangular shape. Each of these members having a rectangular shape in a plan view has the long sides which are arranged in parallel with the X direction and the short sides which are arranged in parallel with the Y direction.

The insulator 16 is provided with an elastic wall surrounding the primary liquid chamber 26. There are provided a pair of X direction elastic walls 40 which are opposed to each other in the X direction and a pair of Y direction elastic walls 42 which are opposed to each other in the Y direction. The X direction elastic walls 40 are continuous with the Y direction elastic walls 42 so as to form the elastic wall of a peripheral wall shape surrounding the primary liquid chamber 26.

Moreover, the X direction elastic wall 40 is relatively thinner than the Y direction elastic wall 42 and has a small spring value (FIG. 2), while the Y direction elastic wall 42 is relatively thicker than the X direction elastic wall 40 and has a large spring value (FIG. 3).

As shown in FIGS. 7 and 8, the insulator 16 has an outline shape of substantially a truncated quadrangular pyramid, and each of the X direction elastic walls 40 is formed on the short side of the insulator 16 formed in a substantially rectangular shape in a plan view while each of the Y direction elastic walls 42 is formed on the long side thereof. Therefore, each of the Y direction elastic walls 42 has a maximum length b in the X direction which is greater than a maximum length a in the Y direction of each of the X direction elastic walls 40 (a<b). Without being limited to these maximum lengths, in a region of the same height in the Z direction, each of the Y direction elastic wall 42 has the length in the X direction which is greater than the length in the Y direction of each of the X direction elastic walls 40.

As shown in FIGS. 8-A and 8-B, each of the elastic walls has a different projected area. A projection chart in the X direction of each of the X direction elastic walls 40 as shown in FIG. 8-A and a projection chart in the Y direction of each of the Y direction elastic walls 42 have the same trapezoid. However, since a trapezoid as shown in FIG. 8-B has the upper base and the lower base which are longer than those of a trapezoid as shown in FIG. 8-A (L4>L3, b>a), the trapezoid as shown in FIG. 8-B has an area larger than the trapezoid as shown in FIG. 8-A. Namely, letting the projected area in the X direction of the X direction elastic wall 40 of FIG. 8-A be S1, and the projected area in the Y direction of the Y direction elastic wall 42 of FIG. 8-B be S2, the projected area S2 is larger than the projected area S1 (S2>S1). Hereinafter, this condition where the projected area S2 in the Y direction of the Y direction elastic wall 42 is relatively larger than the projected area S1 in the X direction of the X direction elastic wall 40 shall be referred to as "the larger projected area of the Y direction elastic wall 42".

Figure 9:
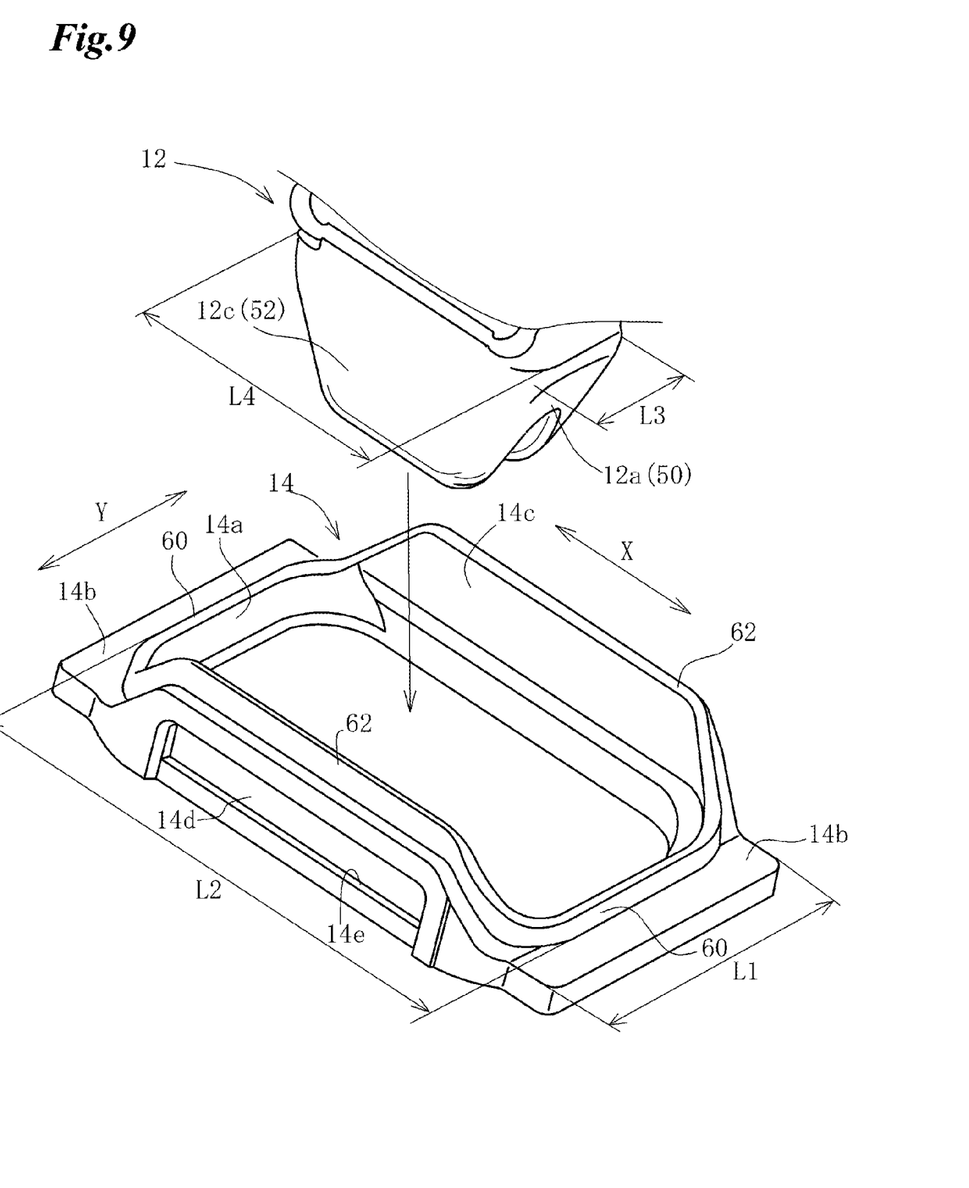
FIG. 9 is a perspective view of a first mounting metal fitting and a second mounting metal fitting.

Next, the first mounting metal fitting 12 and the second mounting metal fitting 14 will be described in detail mainly with reference to FIGS. 4, 5 and 9. Herein, FIG. 9 is a perspective view of each of the first mounting metal fitting 12 and the second mounting metal fitting 14 and shows a separated state before fitting the first mounting metal fitting 12 (partially shown) into an interior of the second mounting metal fitting 14.

A part of the first mounting metal fitting 12 which projects downwardly and restrains each of the upper parts of the X direction elastic wall 40 and the Y direction elastic wall 42 is formed in a rectangular shape in a plan view (see FIG. 7), wherein the short side part is formed with an X direction restraint projecting part 50 and the long side part is formed with a Y direction restraint projecting part 52.

As shown in FIGS. 4 and 5, an outer surface of each of the X direction restraint projecting part 50 and the Y direction restraint projecting part 52 is formed as a first mounting metal fitting side first taper portion 12a and a first mounting metal fitting side second taper portion 12c.

A projecting amount of the X direction restraint projecting part 50 is relatively smaller than that of the Y direction restraint projecting part 52, and a restraint area of the X direction restraint projecting part 50 relative to the upper part of the X direction elastic wall 40 becomes small.

On the other hand, the Y direction restraint projecting part 52 extends relatively long downwardly and has a sufficient length for restraining an upper part of the thick Y direction elastic wall 42, so that a restraint area of the Y direction restraint projecting part 52 relative to the upper part of the Y direction elastic wall 42 becomes large.

By the way, as shown in FIG. 9, letting a maximum length in the Y direction of the X direction restraint projecting part 50 be L3 and a maximum length in the X direction of the Y direction restraint projecting part 52 be L4, L4 is greater than L3 (L3<L4).

Herein, without being limited to these maximum lengths, in a region of the same height in the Z direction, the length in the X direction of the Y direction restraint projecting part 52 is configured to be greater than the length in the Y direction of the X direction restraint projecting part 50.

The second mounting metal fitting 14, as shown in FIG. 7, has a substantially rectangular frame shape. X direction restraint walls 60 which project upwardly are formed on the short sides of a part surrounding a rectangular space in a middle region. On the long sides of a rectangle there are provided Y direction restraint walls 62 which project long upwardly. The X direction restraint walls 60 are continuous with the Y direction restraint walls 62 so as to form a peripheral wall which surrounds an opening part of the second mounting metal fitting 14.

However, a projecting amount of each of the X direction restraint walls 60 is different from a projecting amount of each of the Y direction restraint walls 62 such that the projecting amount of the X direction restraint wall 60 is relatively reduced and the projecting amount of the Y direction restraint wall 62 is relatively increased.

An internal wall of the X direction restraint wall 60 is formed with a second mounting metal fitting side first taper portion 14a which opens outwardly with approach towards an upper side. In addition, an internal wall of the Y direction restraint wall 60 also is formed with a second mounting metal fitting side second taper portion 14c which opens outwardly with approach towards an upper side.

The second mounting metal fitting side first taper portions 14a and the second mounting metal fitting side second taper portions 14c are configured to function as restraint portions for restraining lower parts of the X direction elastic walls 40 and the Y direction elastic walls 42, respectively. An area of the second mounting metal fitting side first taper portion 14a is small and an area of the second mounting metal fitting side second taper portion 14c is large, so that an restraint area of the second mounting metal fitting side second taper portion 14c with respect to the lower part of the insulator 16 is larger than that of the second mounting metal fitting side first taper portion 14a.

Further, the second mounting metal fitting side first taper portion 14a is located outwardly of and on a lower side of the first mounting metal fitting side first taper portion 12a in such a way as to be opposed to the first mounting metal fitting side first taper portion 12a. The second mounting metal fitting side second taper portion 14c is located outwardly of and on a lower side of the first mounting metal fitting side second taper portion 12c in such a way as to be opposed to the first mounting metal fitting side second taper portion 12c. The second mounting metal fitting side first taper portion 14a is substantially parallel to the first mounting metal fitting side first taper portion 12a, and the second mounting metal fitting side second taper portion 14c is substantially parallel to the first mounting metal fitting side second taper portion 12c, respectively.

By the way, as shown in FIG. 9, letting a Y direction maximum length which is the length in the Y direction of the base part of the X direction restraint wall 60 be L1 and an X direction maximum length which is the length in the X direction of the base part of the Y direction restraint wall 62 be L4, the X direction maximum length L2 of the Y direction restraint wall 62 is greater than the Y direction maximum length L1 of the X direction restraint wall 60 (L1<L2).

Herein, without being limited to these maximum lengths, in a region of the same height in the Z direction, the length in the X direction of the Y direction restraint wall 62 is configured to be greater than the length in the Y direction of the X direction restraint wall 60. In addition, the length L1 is approximately equal to the maximum length a in the Y direction of the X direction elastic wall 40 and the length L2 is approximately equal to the maximum length b in the X direction of the Y direction elastic wall 42.

Next, the spring values in the X and Y directions which are formed by each of the restraint walls will be described. As shown in FIG. 4, a predetermined distance D1 is provided between a lower end portion of the X direction restraint projecting part 50 and an upper end portion of the X direction restraint wall 60, and the X direction restraint projecting part 50 is arranged spaced apart from the X direction restraint wall 60 in the upward and downward direction so as not to overlap with each other in the X direction. Therefore, the X direction elastic wall 40 has a long free length. In addition, since the X direction elastic wall 40 itself is thin and the restraint areas by the first mounting metal fitting side first taper portion 12a and the second mounting metal fitting side first taper portion 14a are small, the X direction elastic wall 40 is elastically deformed mainly due to the shear deformation with respect to the input in the X direction, and the spring value of the X direction elastic wall 40, that is, the spring value in the X direction becomes small.

Further, as shown in FIG. 5, the Y direction restraint projecting part 52 and the Y direction restraint wall 62 are configured to mutually project long in the upward and downward direction so as to overlap with each other in the Y direction in such a manner that a lower end portion of the Y direction restraint projecting part 52 and an upper end portion of the Y direction restraint wall 62 overlap with each other at a predetermined overlapping amount D2. Therefore, the free length of the Y direction elastic wall 42 becomes short. Moreover, the restraint areas of the first mounting metal fitting side second taper portion 12c and the second mounting metal fitting side second taper portion 14c with respect to the Y direction elastic wall 42 are large, and the Y direction elastic wall 42 is formed thick. Therefore, with respect to the input in the Y direction, the Y direction elastic wall 42 is deformed mainly due to the compressive deformation between the first mounting metal fitting side second taper portion 12c and the second mounting metal fitting side second taper portion 14c, so that the spring value in the Y direction becomes larger.

In addition, the Y direction elastic wall 42 is thick and long (the maximum length b) in the X direction and has the larger projected area S2, so that the elastic body volume in relation to the spring value is increased whereby the spring value in the Y direction also becomes larger.

Accordingly, the spring ratio of the X direction to the Y direction can be fluctuated large.

Moreover, since the first mounting metal fitting side second taper portion 12c and the second mounting metal fitting side second taper portion 14c which have the large restraint area are formed on the long sides, the restraint area can be freely increased necessarily.

Next, the operation of the embodiment will be described. In FIG. 1, when the vibration of the engine is inputted from the first bracket 18, the input of the main vibration in the Z direction is absorbed by the elastic deformation of the insulator 16 and the fluid resonance of the orifice passage 30.

With respect to the input in the X direction, in FIG. 4, the X direction restraint projecting part 50 is relatively moved in the X direction in relation to the X direction restraint wall 60, whereby the input in the X direction is absorbed by the spring of the X direction elastic wall 40. At that time, since the X direction restraint projecting part 50 is spaced apart by the predetermined distance D1 from the X direction restraint wall 60, the X direction elastic wall 40 is elastically deformed mainly due to the shear deformation. In addition, the X direction elastic wall 40 is formed to be thin, the restraint area by the first mounting metal fitting side first taper portion 12a and the second mounting metal fitting side first taper portion 14a which are opposed to each other is small, and the free length of the X direction elastic wall 40 is long. Therefore, the spring value in the X direction becomes relatively small.

On the other hand, with respect to the input in the Y direction, in FIG. 5, the Y direction restraint projecting part 52 is relatively moved in relation to the Y direction restraint wall 62, whereby the input in the Y direction is absorbed by the spring of the Y direction elastic wall 42. At that time, since the Y direction restraint projecting part 52 overlaps with the Y direction restraint wall 62 in the Y direction at the overlapping amount D2, the Y direction elastic wall 4 is elastically deformed mainly due to the compressive deformation. In addition, the Y direction elastic wall 42 is thick, the restraint area by the first mounting metal fitting side second taper portion 12c and the second mounting metal fitting side second taper portion 14c which are opposed to each other is large, and the free length of the Y direction elastic wall 42 is short. Therefore, the spring value in the Y direction becomes relatively large. In this way, the spring ratio of the X direction to the Y direction of the insulator 16 can be increased.

In addition, this spring ratio can be easily adjusted by adjusting the projecting amounts of the X direction restraint wall 60 and the Y direction restraint wall 62 of the second mounting metal fitting 14.

Moreover, since the Y direction elastic wall is formed long in the X direction and has the larger projected area S2 whereby to be able to increase the volume of the elastic body with respect to the input in the Y direction, the stress can be distributed widely and the adjustment of the spring value in the Y direction for increasing the restraint area and shortening the free length as referred to above becomes easy.

Further, since the Y direction restraint wall 62 on the long side is made larger in area, the Y direction elastic wall 42 having the larger projected area S2 can be supported long and widely in the X direction, so that the stress concentration relative to the restraint part can be alleviated.

As a result, the spring ratio in the Y direction can be increased and the durability can be improved. Therefore, the increase in spring ratio and the improvement in durability can be achieved by utilizing the rectangular shape (non-circular shape) of the insulator (16).

Further, since the non-circular shapes of the insulator 16 and the second mounting metal fitting 14 are formed into a rectangular shape respectively, the spring ratio of the X direction to the Y direction can be easily made larger.

At that time, since the X direction elastic wall 40 is different in thickness from the Y direction elastic wall 42 such that the thickness of the X direction elastic wall 40 is relatively thinner than the thickness of the Y direction elastic wall 42, the spring ratio of the X direction to the Y direction can be varied larger.

Further, since the X direction restraint projecting part 50 and the X direction restraint wall 60 are spaced apart so as not to overlap with each other in the X direction, the X direction elastic wall 40 is deformed mainly due to the shear deformation with respect to the input in the X direction, whereby the spring value in the X direction can be reduced.

Further, since the Y direction restraint projecting part 52 and the Y direction restraint wall 62 overlap with each other in the Y direction, the Y direction elastic wall 42 is deformed mainly due to the compressive deformation with respect to the input in the Y direction, whereby the spring ratio in the Y direction can be increased.

By the way, it is to be understood that the present invention is not limited to the above embodiment and that various changes and modifications may be made in the invention without departing from the spirit and scope thereof. For example, the non-circular shape is not limited to the rectangular shape but shapes having different lengths with respect to the X direction and the Y direction, such as an ellipse, a flat oval and the like may be adopted.

Moreover, as a method for forming the large spring ratio of the X direction to the Y direction, in addition to the method of forming the insulator 16 and the second mounting metal fitting 14 in a non-circular shape, either the method of differentiating the thicknesses of the X direction elastic wall 40 and the Y direction elastic wall 42 or the method of differentiating the projecting amounts of the X direction restraint wall 60 and the Y direction restraint wall 60 in order that the X direction elastic wall 40 is deformed mainly due to the shear deformation and that the Y direction elastic wall 42 is deformed mainly due to the compressive deformation as referred to above, or varying combination of both may be adopted.

Further, the X direction and the Y direction are not limited to the forward and rearward direction and the left and right direction of the vehicle body, but proper directions may be adopted.

Furthermore, without limiting to the liquid sealed type, the present invention may be applied to non-liquid-sealed type that the liquid is not filled into the recessed space 17. In this case, the diaphragm 22 and the partition member 24 are dispensed with, and the outward projecting part 14*b* is configured to be press fitted into the press fitting concave part 21 of smaller size. In addition, the present invention may be applied to various kinds of vibration isolating devices other than the engine mount.

What is claimed is:

1. A vibration isolating device comprising:
    a first mounting metal fitting to be mounted on a vibration generating source side;
    a second mounting metal fitting to be mounted on a vibration receiving side; and
    an insulator providing a connection between the first and second mounting metal fittings and having an elastic wall part of non-circular shape in a plan view which surrounds a recessed space provided on an inner side;
    wherein letting (X) and (Y) be two directions intersecting at right angles to each other within a plane orthogonal to an inputting direction of a main vibration, the elastic wall part of the insulator includes a pair of (X) direction elastic walls which are opposed to each other in the (X) direction and a pair of (Y) direction elastic walls which are opposed to each other in the (Y) direction;
    wherein a length in the (X) direction of each of the (Y) direction elastic walls is greater than a length in the (Y) direction of each of the (X) direction elastic walls and a projected area in the (Y) direction of each of the (Y) direction elastic walls is larger than a projected area in the (X) direction of each of the (X) direction elastic walls;
    wherein the second mounting metal fitting has a length in the (X) direction different from that in the (Y) direction in such a manner as to be long in the (X) direction and short in the (Y) direction;
    wherein the second mounting metal fitting is formed at its periphery with a standing wall part which projects in the (Z) direction so as to restrain the insulator, and the standing wall part includes a pair of (X) direction restraint walls which are opposed to each other in the (X) direction and a pair of (Y) direction restraint walls which are opposed to each other in the (Y) direction; and
    wherein a length in the (X) direction of a base part of each of the (Y) direction restraint walls is greater than a length in the (Y) direction of a base part of each of the (X) direction restraint walls, and a projecting height of each of the (Y) direction restraint walls is larger than that of each of the (X) direction restraint walls.

2. The vibration isolating device according to claim 1, wherein a thickness of the (X) direction elastic wall of the insulator is relatively thinner than a thickness of the (Y) direction elastic wall.

3. The vibration isolating device according to claim 2, wherein the first mounting metal fitting is provided with a restraint projecting part which projects toward the second mounting metal fitting side so as to restrain the insulator, and wherein the restraint projecting part includes a pair of (X) direction restraint projecting parts which are opposed to each other in the (X) direction and a pair of (Y) direction restraint projecting parts which are opposed to each other in the (Y) direction, each of the (X) direction restraint projecting parts is arranged spaced apart so as not to overlap with the (X) direction restraint wall of the second mounting metal fitting in the (X) direction, and the (X) direction elastic wall is elastically deformed mainly due to shear deformation.

4. The vibration isolating device according to claim 2, wherein the non-circular shape is substantially a rectangular shape.

5. The vibration isolating device according to claim 3, wherein the non-circular shape is substantially a rectangular shape.

6. The vibration isolating device according to claim 1, wherein the first mounting metal fitting is provided with a restraint projecting part which projects toward the second mounting metal fitting side so as to restrain the insulator, and wherein the restraint projecting part includes a pair of (X) direction restraint projecting parts which are opposed to each other in the (X) direction and a pair of (Y) direction restraint projecting parts which are opposed to each other in the (Y) direction, each of the (X) direction restraint projecting parts is arranged spaced apart so as not to overlap with the (X) direction restraint wall of the second mounting metal fitting in the (X) direction, and the (X) direction elastic wall is elastically deformed mainly due to shear deformation.

7. The vibration isolating device according to claim 6, wherein each of the (Y) direction restraint projecting parts projects long so as to overlap with the (Y) direction restraint wall in the (Y) direction, and the (Y) direction elastic wall is elastically deformed mainly due to compressive deformation between the (Y) direction restraint projecting part and the (Y) direction restraint wall in the (Y) direction.

8. The vibration isolating device according to claim 7, wherein the non-circular shape is substantially a rectangular shape.

9. The vibration isolating device according to claim 6, wherein the non-circular shape is substantially a rectangular shape.

10. The vibration isolating device according to claim 1, wherein the non-circular shape is substantially a rectangular shape.

* * * * *